(12) United States Patent
Seo et al.

(10) Patent No.: US 11,262,479 B2
(45) Date of Patent: Mar. 1, 2022

(54) VISIBILITY IMPROVING FILM FOR DISPLAY PANEL AND DISPLAY DEVICE COMPRISING SAME

(71) Applicant: LG CHEM, LTD., Seoul (KR)

(72) Inventors: Kwangseok Seo, Daejeon (KR); Han Na Lee, Daejeon (KR); Yeong Rae Chang, Daejeon (KR); Jin Seok Byun, Daejeon (KR); Yun U Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/651,595

(22) PCT Filed: Sep. 28, 2018

(86) PCT No.: PCT/KR2018/011566
§ 371 (c)(1),
(2) Date: Mar. 27, 2020

(87) PCT Pub. No.: WO2019/066579
PCT Pub. Date: Apr. 4, 2019

(65) Prior Publication Data
US 2020/0257021 A1  Aug. 13, 2020

(30) Foreign Application Priority Data

Sep. 29, 2017 (KR) .................. 10-2017-0128261
Sep. 27, 2018 (KR) .................. 10-2018-0115321

(51) Int. Cl.
| | | |
|---|---|---|
| G02B 1/04 | (2006.01) |
| B32B 27/08 | (2006.01) |
| G02B 1/18 | (2015.01) |
| G02B 5/20 | (2006.01) |
| G02B 1/111 | (2015.01) |
| B32B 7/02 | (2019.01) |

(52) U.S. Cl.
CPC .................. G02B 1/04 (2013.01); B32B 7/02 (2013.01); B32B 27/08 (2013.01); G02B 1/111 (2013.01); G02B 1/18 (2015.01); G02B 5/20 (2013.01); *C09K 2323/00* (2020.08); *C09K 2323/03* (2020.08); *C09K 2323/06* (2020.08)

(58) Field of Classification Search
CPC .. C09D 135/02; C08K 3/08; C08K 2201/005; C08K 2003/0812; C08K 2003/0806; B32B 27/06; B32B 27/36; B32B 2307/412; B32B 2307/416; B32B 2457/202; B32B 2457/206; G02B 1/11; G02B 5/0242; G02B 5/0284; C09K 2323/03; C09K 2323/035; C09K 2323/06

USPC ........... 428/1.1, 1.3, 1.33, 1.6; 359/599, 609
See application file for complete search history.

(56) References Cited

U.S. PATENT DOCUMENTS

| | | |
|---|---|---|
| 10,288,780 B2 | 5/2019 | Yamaki |
| 2002/0113925 A1 | 8/2002 | Higashi |
| 2009/0231713 A1 | 9/2009 | Takada |
| 2014/0002901 A1 | 1/2014 | Kishi et al. |
| 2015/0116648 A1 | 4/2015 | Shin et al. |
| 2015/0185890 A1 | 7/2015 | Kaneko et al. |
| 2016/0289459 A1* | 10/2016 | Ohashi ................ C09D 133/00 |
| 2017/0351009 A1 | 12/2017 | Matsuo et al. |
| 2018/0292582 A1 | 10/2018 | Matsuo et al. |
| 2018/0348411 A1 | 12/2018 | Yamaki et al. |

FOREIGN PATENT DOCUMENTS

| | | |
|---|---|---|
| CN | 100498457 C | 6/2009 |
| CN | 101533110 A | 9/2009 |
| CN | 104540678 A | 4/2015 |
| CN | 104834028 A | 8/2015 |
| CN | 108292090 A | 7/2018 |
| JP | 2002-182019 A | 6/2002 |
| JP | 2004-013701 A | 1/2004 |
| JP | 2006-159892 A | 6/2006 |
| JP | 2009-103808 A | 5/2009 |
| JP | 2009-116014 A | 5/2009 |
| JP | 2009-217065 A | 9/2009 |
| JP | 2014-046622 A | 3/2014 |
| KR | 10-2009-0097807 A | 9/2009 |
| KR | 10-1202109 B1 | 11/2012 |
| KR | 10-2014-0001749 A | 1/2014 |
| KR | 10-2015-0048128 A | 5/2015 |
| KR | 10-2015-0050698 A | 5/2015 |
| KR | 10-2015-0057474 A | 5/2015 |
| KR | 10-2015-0093110 A | 8/2015 |
| KR | 10-2015-0109854 A | 10/2015 |
| KR | 10-1562026 B1 | 10/2015 |
| KR | 10-2017-0091163 A | 8/2017 |

(Continued)

OTHER PUBLICATIONS

PCT Search Report & Written Opinion issued for International Application No. PCT/KR2018/011566 dated Jan. 10, 2019,10 pages.

*Primary Examiner* — Ruiyun Zhang
(74) *Attorney, Agent, or Firm* — Rothwell, Figg, Ernst & Manbeck, P.C.

(57) ABSTRACT

The present invention relates to a visibility improving film for a display panel and a display device including the same. More specifically, the present invention relates to a visibility improving film for a display panel capable of exhibiting excellent physical and optical properties particularly while improving the visibility of a laser pointer, by including fine metal particles dispersed in the photocurable resin layer, and to a display device including the same.

15 Claims, No Drawings

(56) References Cited

FOREIGN PATENT DOCUMENTS

| | | | |
|---|---|---|---|
| KR | 10-2018-0063328 | A | 6/2018 |
| TW | 200951482 | A | 12/2009 |
| WO | 2016-104112 | A1 | 6/2016 |
| WO | 2017-094550 | A1 | 6/2017 |

* cited by examiner

VISIBILITY IMPROVING FILM FOR DISPLAY PANEL AND DISPLAY DEVICE COMPRISING SAME

CROSS-REFERENCE TO RELATED APPLICATION(S)

This application is a 35 U.S.C. 371 National Phase Entry Application from PCT/KR2018/011566, filed on Sep. 28, 2018, designating the United States and which claims the benefits of filing dates of Korean Patent Application No. 10-2017-0128261 filed with Korean Intellectual Property Office on Sep. 29, 2017, and Korean Patent Application No. 10-2018-0115321 filed with Korean Intellectual Property Office on Sep. 27, 2018, the entire contents of which are incorporated herein by reference.

The present invention relates to a visibility improving film for a display panel and a display device including the same.

More specifically, the present invention relates to a visibility improving film for a display panel capable of exhibiting excellent optical properties such as luminance and contrast ratio particularly while improving the visibility of a laser pointer, by including fine metal particles having a specific size and shape, and to a display device including the visibility improving film for the display panel.

TECHNICAL FIELD

Background of the Invention

For a presentation in, for example, lectures, conferences, or announcements, it is common for material images to be reproduced using a display device and for the presenter to give a presentation while pointing to a screen or the like using a laser pointer at a certain position on a presentation image.

Conventionally, the presentation is often performed by projecting material images on a screen or wall using a beam projector. However, in the case of the projector system, there are disadvantages in that the contrast ratio and image quality are not good. Recently, a high number of large-sized display panels with various driving methods such as LCDs, PDPs, and OLEDs have been supplied, and thereby it is becoming possible o make presentations by displaying images directly on the displays.

However, the display device has light emission characteristics, and there is no factor that can scatter the laser light in addition to specular reflection at a specific angle. This causes a problem in that the visibility of the laser pointer is remarkably deteriorated.

Therefore, there is still a need to develop a method for improving the visibility of a laser pointer in a display device without requiring excessive additional steps.

BRIEF SUMMARY OF THE INVENTION

The present invention provides a visibility improving film for a display panel capable of exhibiting excellent physical and optical properties while improving the visibility of a laser pointer at a low cost in a display panel such as an LCD, a PDP, and an OLED, and a display device including the same.

The present invention provides a visibility improving film for a display panel, including:

a substrate; and a photocurable resin layer that is provided on at least one side of the substrate and in which fine metal particles with a number average particle diameter of 0.5 to 5 μm and a flattening ratio of 0.5 or less are dispersed, wherein a relative visibility evaluation value represented by the following Formula 1 is 3 or more:

Visibility Evaluation Value=$B1/A1$     [Formula 1]

wherein, in the above Formula 1,

A1 is a luminance value measured from the front side, when a film having a transmittance value of 70 to 100 as measured according to JIS K 7361 and a haze value of 20 to 25 as measured according to JIS K 7136 is bonded to a glass slide, then placed on a backlight surface and irradiated with laser light at 45° with respect to the normal direction, and B1 is a luminance value measured from the front side, when the visibility improving film for a display panel is bonded to a slide, then placed on a backlight surface and irradiated with the same laser light at 45° with respect to the normal direction.

Advantageous Effects

The visibility improving film for a display panel according to the present invention can remarkably improve the visibility of a laser pointer, which is deteriorated on a display device.

Such an effect can be obtained by applying it in the form of a film to the outside of the display panel without changing the display driving method, the color filter inside the panel, the laminated structure, or the like, and therefore production costs can be reduced since excessive process modification or cost increases are not required.

DETAILED DESCRIPTION OF THE INVENTION

The visibility improving film for a display panel according to the present invention includes:

a substrate; and a photocurable resin that is provided on at least one side of the substrate and in which fine metal particles with a number average particle diameter of 0.5 to 5 μm and a flattening ratio of 0.5 or less are dispersed, wherein a relative visibility evaluation value represented by the following Formula 1 is 3 or more:

Visibility Evaluation Value=$B1/A1$     [Formula 1]

wherein, in the above Formula 1,

A1 is a luminance value measured on the front surface, when a film having a transmittance value of 70 to 100 as measured according to JIS K 7361 and a haze value of 20 to 25 as measured according to JIS K 7136 is bonded to a glass slide, then placed on a backlight surface and irradiated with a laser light at 45° with respect to the normal direction, and B1 is a luminance value measured from the front side, when the visibility improving film for a display panel is bonded to a glass slide, then placed on a backlight surface and irradiated with the same laser light at 45° with respect to the normal direction.

In addition, the display device of the present invention includes the display panel and the visibility improving film for the display panel mounted on the display panel.

In the present invention, the term "upper surface" means a surface arranged to face a viewer when the film is mounted on a display panel, and the term "upper" means the direction directed toward the viewer. Conversely, the term "lower surface" or "lower" means a surface or a direction arranged to face a side opposite to a viewer when the film is mounted on a display panel.

In the present invention, simply, the haze value or the total haze value means a haze value (Ht) measured with respect to the film itself without any further treatment on the film. The total haze value (Ht) represents the sum of the haze value due to the surface unevenness of the film and the haze value due to the particles or the like contained in the film.

In the present invention, the transparent film is a film including a transparent substrate and a transparent photocurable layer, and means a transparent film having a total haze value (Ht) described above of about 1% or less, or about 0 to 1% or less, and preferably about 0 to about 0.5% or less. Specifically, the transparent photocurable layer contained in the transparent film does not contain fine particles therein, and has high transparency and a very low haze value (Ht) as described above, and thus it may be used to measure a relative luminance for the evaluation of the visibility. Specifically, for example, it may be a concept including a film corresponding to Comparative Example 13 of the present invention.

Further, the terms used herein are used only to explain illustrative examples, and are not intended to limit the invention. A singular expression includes a plural expression unless clearly meaning otherwise. It should be understood that the terms "comprise", "include", and "have" as used herein are intended to designate the presence of stated features, numbers, steps, constitutional elements, or combinations thereof, but it should be understood that they do not preclude the possibility of existence or adding of one or more other features, numbers, steps, constitutional, or combinations thereof.

Further, in the present invention, in case a layer or an element is mentioned to be formed "on" or "above" another layer or element, it means that the layer or element is directly formed on the other layer or element, or it means that another layer or element may be additionally formed between layers or on a subject or substrate.

Since a variety of modification may be made to the present invention and there may be various forms of the present invention, specific examples are illustrated and will be described in detail below. However, it should be understood that this is not intended to limit the present invention to particular forms disclosed herein, and the invention compasses all modifications, equivalents, or alternatives falling within the spirit and technical scope of the present invention.

Hereinafter, the visibility improving film for a display panel and the display device including the same according to embodiments of the present invention will be described in more detail.

According to embodiments of the present invention, a visibility improving film for a display panel is provided, including:

a substrate; and a photocurable resin layer that is provided on at least one side of the substrate and in which fine metal particles with a number average particle diameter of 0.5 to 5 μm and a flattening ratio of 0.5 or less are dispersed, wherein a relative visibility evaluation value represented by the following Formula 1 is 3 or more:

Visibility Evaluation Value=$B1/A1$     [Formula 1]

wherein, in the above Formula 1, $A1$ is a luminance value measured on the front surface, when a film having a transmittance value of 70 to 100 as measured according to JIS K 7361 and a haze value of 20 to 25 as measured according to JIS K 7136 is bonded to a glass slide, then placed on a backlight surface and irradiated with a laser light at 45° with respect to the normal direction, and $B1$ is a Luminance value measured from the front side, when the visibility improving film for a display panel is bonded to a glass slide, then placed on a backlight surface and irradiated with the same laser light at 45° with respect to the normal direction.

The visibility improving film for a display panel formed by using the coating composition according to the present invention can exhibit characteristic refraction properties with respect to light in a wavelength range used for a laser pointer, and thus can contribute to improvement of the visibility of the laser pointer.

Such a visibility improving film for a display panel includes a cured product of a binder containing a photocurable functional group and fine metal particles dispersed in the photocurable binder.

Commonly used films for display panels include at least one substrate selected from the group consisting of glass, a polyester such as polyethylene terephthalate (PET), a polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetherether ketone (PEEK), polyethylene naphthalate (PEN), polyetherimide (PEI), polyimide (PI), MMA (methyl methacrylate), a fluorocarbon resin, triacetylcellulose (TAC), and the like.

Among these substrates, triacetylcellulose (TAC) films are particularly excellent in optical properties and thus are frequently used.

According to one embodiment of the invention, the photocurable resin layer may be formed on one side or both sides of the substrate. In particular, when the resin layer is formed so as to be on the side of the upper portion of the substrate, that is, in the direction of the viewer, the resin layer can also serve as a hard coating layer.

According to one embodiment of the invention, a photocurable resin layer is formed by coating and ultraviolet-curing on a substrate, and a coating composition laminated on at least one side of a display panel, which can be used for a visibility improving film for a display panel, is used.

The coating composition for producing the visibility improving film for a display panel of the present invention may include: a binder containing a photocurable functional group; fine metal particles dispersed in the binder and having a size of 0.5 to 5 μm and a flattening ratio of 0.5 or less; a photo-polymerization initiator; solvents; etc.

The binder containing the photo-curable functional group is not particularly limited as long as it is a compound containing an unsaturated functional group capable of causing a polymerization reaction by ultraviolet rays, but it may be a compound containing a (meth)acrylate group, an allyl group, an acryloyl group, or a vinyl group as the photo-curable functional group. According to one embodiment of the invention, the binder containing the photo-curable functional group may be at least one selected from the group consisting of a multifunctional acrylate-based monomer, a multifunctional acrylate-based oligomer, and a multifunctional acrylate-based elastic polymer.

In the present invention, the acrylate-based means not only acrylates, but also methacrylates, or derivatives of acrylates or methacrylates having substituents introduced therein.

The multifunctional acrylate-based monomer means a monomer containing two or more acrylate-based functional groups. More specific examples thereof may include hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tri(tetra)acrylate (PETA), dipentaerythritol hexaacrylate (DPHA), or the like, but the coating composition of the present invention is not limited thereto. The multifunctional acrylate-based monomer performs a role of providing certain pencil strength and abrasion resistance to the film by being cross-linked.

The multifunctional acrylate-based monomer may be used either alone or as a combination of different types.

The multifunctional acrylate-based oligomer is an oligomer having two or more acrylate functional groups, and may have a weight average molecular weight in a range of about 1000 to about 10,000 g/mol about 1000 to about 5000 g/mol, or about 1000 to about 3000 g/mol.

Further, according to one embodiment of the present invention, the multifunctional acrylate-based oligomer may be an acrylate-based oligomer modified with one or more types of urethane, ethylene oxide, propylene oxide, or caprolactone. When using the modified multifunctional acrylate-based oligomer, flexibility is further imparted to the multifunctional acrylate-based oligomer due to modification and thus a curl property and flexibility of a protective film can be increased.

The multifunctional acrylate-based oligomer may be used either alone or as a combination of different types.

The multifunctional acrylate-based elastic polymer is excellent in flexibility and elasticity, and is a polymer containing two or more acrylate functional groups, which may have a weight average molecular weight ranging from about 100,000 to about 800,000 g/mol from about 150,000 to about 700,000 g/mol, or from about 180,000 to about 650,000 g/mol.

A protective film formed by using a coating composition including the multifunctional acrylate-based elastic polymer may secure high elasticity or flexibility while securing mechanical properties, and may minimize curl or crack occurrences.

Another example of the multifunctional acrylate-based elastic polymer may include a urethane-based acrylate polymer. The urethane-based acrylate polymer has a form of a urethane-based acrylate oligomer being linked to an acrylic polymer main chain as a side branch.

Meanwhile, according to one embodiment of the present invention, the coating composition can exhibit light scattering properties of a laser pointer by including fine metal particles. When the coating composition includes fine metal particles, the photocurable resin layer cured by using this can effectively scatter a laser light used for the laser pointer, thereby improving the visibility.

Generally, when producing a film or the like for a display panel, inorganic fine particles such as organic particles or metal oxides are often used in the coating composition or the like. This is because the corresponding particles have high transmittance.

Such transmissive particles and the like cause light scattering mainly by refraction and diffraction, while the metal particles reflect light. More specifically, in the case of the transmissive particles, light scattering due to diffraction and refraction occurs consecutively along the path along which the light travels. Consequently, the light spreads and cloudy light appears. However, in the case of metal particles, since light scattering occurs due to reflection without transmitting light, light scattering does not occur consecutively along the path along which the light travels, and the light spreading phenomenon does not occur.

In particular, when metal oxide-based inorganic particles such as titanium dioxide ($TiO_2$) particles having a different refractive index from that of the binder are used, a high light scattering effect can be obtained, but there is a disadvantage that the contrast ratio is greatly lowered due to high transmittance of the particles.

The contrast ratio of the display device is caused by the difference between the brightness of the image coming from the display panel and the brightness difference due to the film. In the case of using the transmissive particles, the brightness in the film is increased by the particles, and eventually, the difference in brightness between the panel and film becomes low and thus the contrast ratio is lowered.

Therefore, the film for a display panel according to the embodiment of the present invention can improve the visibility of laser pointer light by using the fine metal particles, and at the same time, realize a high contrast ratio.

The number average particle diameter of the fine metal particles may be about 0.5 μm or more from the viewpoint of optimizing the light scattering effect, and in order to make haze and coating thickness appropriate, it can be a particle with a size of 5 μm or less, more preferably about 0.5 to about 3 μm, or about 1 to about 3 μm.

When the particle size of the fine metal particles is too small, the effect of improving the visibility of a laser pointer light due to scattering of light may be insignificant, and when the particle diameter of the fine metal particles is too large, a protrusion is formed on the surface of the film, which may cause a decrease in optical properties such as transparency and transmittance.

More specific examples of metals satisfying these conditions include at least one metal selected from the group consisting of aluminum, gold, silver, magnesium, platinum, copper, titanium, zirconium, nickel, tin, silicon, and chromium, or an alloy thereof, but the present invention is not necessarily limited thereto.

According to one embodiment of the present invention, when the total weight of the binder containing a photocurable functional group is taken as 100 parts by weight, the fine metal particles may be contained in an amount of about 0.5 to about 15 parts by weight, preferably about 1 to about 15 parts by weight, or about 1 to about 10 parts by weight.

When the fine metal particles are contained in an excessively small amount, the light reflection effect at the corresponding wavelength is insignificant and thus the effect of improving the visibility of the laser pointer may not be sufficient. When the fine metal particles are contained in an excessively large amount, color reproducibility and luminance of the display device may be lowered, and other physical properties of the coating composition may be deteriorated. In this respect, it is preferable to be included in the above range.

In this case, the fine metal particles are spherical particles having a number average particle size of 0.5 to 5 μm and a flattening ratio of 0.5 or less.

The "flattening ratio" is referred to as ellipticity, and is the amount indicating the degree of flatness of a three-dimensional rotating ellipsoid. It is a value represented by $(a-b)/a$ when the long diameter is a and the short radius is b. The flattening ratio of a sphere is 0, and the flattening ratio of a plane is 1.

When the value of the flattening ratio is too large (in the case of plate-like particles), the light reflection/scattering due to the metal particles inside the film excessively occurs, and it cannot be suitable for display film applications due to the sparkling appearance and this may cause a problem that the white turbidity increases and thus contrast ratio is lowered.

In this respect, it is more preferable that the value of the flattening ratio of the fine metal particles used in the present invention is about 0.3 or less.

Meanwhile, these fine metal particles may be used alone, but when mixed in the photocurable resin layer, it may be more preferable to use them in a form in which they are previously dispersed in the dispersion in terms of enhancing the dispersibility.

Examples of the photo-polymerization initiator contained in the coating composition of the present invention may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methyl benzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, and bis(2,4,6-trimethylbenzoyl)-phenylphosphine oxide, and the like. In addition, examples of products now commercially available may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, or the like. These photo-polymerization initiators may be used alone or in combination of two or more kinds.

According to one embodiment of the present invention, the content of the photo-polymerization initiator is not particularly limited, but it may be used in an amount of about 0.1 to 10 parts by weight, based on 100 parts by weight of the total weight of the binder containing the photocurable functional group, without deteriorating physical properties of the total coating composition.

The organic solvent contained in the coating composition of the present invention may be an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methylethylketone, methylisobutyl ketone, methylpropyl ketone, and cyclohexanone; an ether solvent such as propylene glycol monopropylether, propylene glycol monomethyl ether, ethylene glycol monethylether, ethylene glycol monopropylether, ethylene glycol monobutylether, diethylene glycol monomethylether, diethylglycolmonoethylether, diethylglycolmonopropylether, diethylglycolmonobutylether, diethylene glycol-2-ethylhexyl ether; an aromatic solvent such as benzene, toluene, and xylene; and they may be used alone or in combination thereof.

According to one embodiment of the present invention, the content of the organic solvent may be variously adjusted within a range that does not deteriorate the physical properties of the coating composition, but the organic solvent may be used in an amount of about 50 to about 200 parts by weight, preferably about 100 to about 200 parts by weight, based on 100 parts by weight of the binder containing the photocurable functional group. When the amount of organic solvent is within the above ranges, it may exert appropriate fluidity and coatability.

Meanwhile, the coating composition of the present invention may further include an additive commonly used in the art to which the present invention pertains, such as a surfactant, an antioxidant, a UV stabilizer, a leveling agent, or an antifouling agent, in addition to the above-described components. Here, the content thereof may be variously adjusted within a range that does not deteriorate the physical properties of the coating composition of the present invention. Thus, there is no particular limitation thereto, but for example, it may be included in an amount of about 0.1 to about 10 parts by weight based on 100 parts by weight of the total coating composition.

According to one embodiment of the present invention, the photocurable resin layer formed by using the coating composition may have a thickness of at least about 1 μm, for example, about 1 to about 50 μm, about 5 to about 30 μm, or about 5 to about 20 μm, after drying and curing. Appropriate optical and physical properties can be exhibited within the thickness range as above.

Accordingly, the ratio of the number average particle diameter of the fine metal particles to the thickness of the photocurable resin layer may preferably be about 0.5 or less.

The visibility improving film for a display panel of the present invention as described above can be formed by coating a coating composition onto a transparent plastic substrate and photo-curing the coating composition.

Specific descriptions and examples of the coating composition and each component constituting the composition are the same as described above.

The method of coating the coating composition is not particularly limited as long as it may be used in the art to which the present technology belongs. For example, a bar coating method, a knife coating method, a roll coating method, a blade coating method, a die coating method, a microgravure coating method, a comma coating method, a slot die coating method, a lip coating method, a solution casting method, or the like may be used.

Next, a protective film may be formed by carrying out a photocuring reaction through irradiating ultraviolet rays on the coated composition. The coated surface of the composition is flattened before irradiating the ultraviolet rays, and a drying step for volatizing a solvent included in the composition may be further carried out.

The amount of the ultraviolet irradiation may be, for example, from about 20 to about 600 mJ/cm$^2$. The light source of the ultraviolet irradiation is not particularly limited as long as it is capable of being used in the art, and examples thereof may include a high pressure mercury lamp, a metal halide lamp, a black light fluorescent lamp, and the like.

The visibility improving film for a display panel of the present invention includes fine metal particles having a specific shape as described above, and can effectively reflect a laser light made incident on the liquid crystal display by means of a laser pointer. Therefore, it is possible to provide a display device capable of realizing excellent image quality with high luminance and contrast ratio, while improving the visibility of a laser pointer.

Specifically, the visibility improving film for a display panel has a relative visibility evaluation value represented by the following Formula 1 of 3 or more:

$$\text{Visibility Evaluation Value} = B1/A1 \quad \text{[Formula 1]}$$

wherein, in the above Formula 1,

A1 is a luminance value measured from the front side, when a film having a transmittance value of 70 to 100 as measured according to JIS K 7361 and a haze value of 20 to 25 as measured according to JIS K 7136, more preferably a film having a transmittance value of 90 to 95 and a haze value of 22 to 25, most preferably a film having a transmittance value of 90.4 and a haze value of 23.8, is bonded to a glass slide, then placed on a backlight surface and irradiated with a laser light at 45° with respect to the normal direction, and B1 is a luminance value measured from the front side, when the visibility improving film for a display panel is bonded to a glass slide, then placed on a backlight surface and irradiated with the same laser light at 45° with respect to the normal direction.

As described above, the visibility improving film for a display panel of the present invention can realize an effect of increasing the luminance by about 50% or more, preferably about 60% or more, relative to the luminance before irradiation, due to the scattering/reflection light by fine metal particles, as compared with the case of using a general UV curable coating layer, and thereby the visibility of the laser pointer can be remarkably improved.

In addition, the visibility improving film for a display panel may have excellent optical properties, for example, may have a value of luminance ratio represented by the following Formula 2 of about 80% or more, and preferably about 80 to about 95%.

$$\text{Luminance Ratio} = (B2/A2)*100 \qquad \text{[Formula 2]}$$

In the above formula 2,

A2 is a luminance value measured from the front side, when a film having a transmittance value of 80 to 100 as measured according to JIS K 7361 and a haze value of 20 to 25 as measured according to JIS K 7136, more preferably a film having a transmittance value of 90 to 95 and a haze value of 22 to 25 as measured according to JIS K 7136, is bonded to a glass slide and then placed on a backlight surface, and B2 is a luminance value measured from the front side, when the visibility improving film for a display panel is bonded to a glass slide and then placed on a backlight surface.

Further, the visibility improving film for a display panel may have a white turbidity value represented by the following Formula 3 of 10 or less, preferably about 9 or less.

$$\text{White Turbidity} = C*100 \qquad \text{[Formula 3]}$$

In the above Formula 3,

C is a luminance value (cd/m$^2$) measured at a height of 7 cm from the front side, when the visibility improving film for a display panel is bonded to a glass slide, then placed on a black acrylic plate and kept under the condition of 9 1x.

Further, the visibility improving film for a display panel may have a transmittance value (Tt) measured according to JIS K 7361 of about 70 to 90%, which represents high light transmittance.

Further, the visibility improving film for a display panel may have a haze value of about 20% or less, or about 10% to about 20%, as measured according to JIS K 7136.

In an optical film or the like, the transmittance and the haze properties change depending on the introduced particles contained in the film. Generally, the greater the amount of the light scattering particles having similar optical properties, the greater the tendency of the transmittance value is of being lowered and the haze being increased.

However, depending on the type of particles used, it is possible to have a characteristic relationship between transmittance and haze. In particular, when the fine metal particles are contained in the resin layer, they have the reflection characteristics as described above, and thus can show a lower haze value than that of the organic fine particles or the inorganic oxide fine particles commonly used in the art, while decreasing light transmittance. In particular, when compared with the case of using the transmissive light scattering particles, even if they show the same transmittance value, there is a feature that they can have a relatively low haze value.

In particular, the light transmittance value varies depending on the content of particles. When the transmittance is too high, there is a problem that the amount of particles for scattering or reflecting light is absolutely deficient, thereby failing to realize appropriate visibility. When the transmittance is too low, the visibility is good, but the contrast ratio and luminance are lowered, which may cause a problem that the image quality of the image to be mounted on the display deteriorates.

Therefore, by limiting the range of the above-described transmittance (Tt) and the characteristic haze value attributable to the use of the fine metal particles, it can exhibit excellent visibility in the use of the laser pointer and at the same time realize an excellent contrast ratio.

According to one embodiment of the present invention, the visibility improvement film for a display panel of the present invention may have a color difference value represented by the following Formula 4 of about 2 or less:

$$\text{Color Difference} = |a*| + |b*| \qquad \text{[Formula 4]}$$

wherein, in the above Formula 4, a* and b* are exponent values in the CIE 1976 L*a*b* color model, respectively.

As described above, the visibility improving film for a display panel according to the present invention can remarkably improve the visibility of a laser pointer and at the same time realize an excellent contrast ratio.

In the visibility improving film for a display panel according to the present invention, the substrate on which the resin layer is formed may be glass or a transparent plastic resin which is commonly used for a display panel. More specifically, according to one embodiment of the present invention, the substrate may include a polyester such as polyethylene terephthalate (PET), a polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetherether ketone (PEEK), polyethylene naphthalate (PEN), polyetherimide (PEI), polyimide (PI), MMA (methyl methacrylate), a fluorocarbon resin, triacetylcellulose (TAC), or the like.

Preferably, the substrate may be a film including triacetyl cellulose (TAC).

The thickness of the substrate is not particularly limited, but it is possible to use a substrate having a thickness of about 20 to about 100 μm, or about 20 to about 60 μm, which is within a range capable satisfying the hardness and other physical properties of the film.

The visibility improving film for a display panel according to the present invention may have pencil hardness of HB or more, 1H or more, or 2H or more at a load of 500 g.

In addition, when steel wool #0 is attached to a friction tester and then reciprocated 10 times with a load of 200 g, a load of 300 g, or a load of 400 g, it can exhibit wear resistance such that scratches do not occur.

According to one embodiment of the present invention, the visibility improvement film for a display panel may be in a form further including: a substrate; a resin layer provided on the substrate; and at least one functional coating layer of the antireflection layer and the antiglare layer, which are formed on the resin layer.

In addition to the antireflection effect in the existing display panel film, by preventing specular reflection when using a laser pointer, the laser pointer light is specularly reflected, thereby effectively preventing it from directly entering the eye of the operator viewing the image. As such antireflection layer, a general antireflection layer which is used in a film for an existing display device or an optical film for a polarizing plate, specifically, for example, an antireflection layer or an antireflection coating (AR) that utilizes interference of light by forming a plurality of layers having different refractive indexes, may be used without particular limitation.

Further, the anti-glare layer allows the laser pointer light to diffusely reflect due to the surface unevenness when using a laser pointer, and thereby it can effectively prevent the reflection light from directly entering the eye of the operator viewing the image. In such anti-glare layer, a method of dispersing a filler such as inorganic fine particles in a resin and imparting unevenness to the surface (anti-glare, AG) and the like can be used without particular limitation.

When the antireflection layer and the anti-glare layer are provided, such a functional coating layer may be preferably located at the top of the film.

Meanwhile, according to another embodiment of the present invention, a display device including a display panel and the above-mentioned visibility improving film for the display panel is provided.

In this case, the display panel is not particularly limited to a driving method or structure, and it can be applied to all of LCD panels, PDP panels, and OLED panels.

The visibility improving film for a display panel and the display panel may be adhered through lamination using a separate adhesive and the like. The adhesive capable of being used herein is not particularly limited as long as it is known in the art. Examples thereof may include water-based adhesives, one component or two component polyvinyl alcohol (PVA)-based adhesives, polyurethane-based adhesives, epoxy-based adhesives, styrene butadiene rubber (SBR)-based adhesives, hot melt-type adhesives, or the like, but the present disclosure is not limited to these examples.

Further, the fact that the resin layer may also serve as an adhesive layer is as described above. When the resin layer does not serve as the adhesive layer, the substrate surface on which the resin layer is not formed adheres to the display panel side, and the resin layer is laminated so as to be located toward the outside, and thereby it may be preferable to form a structure for directly facing the surface to which the laser pointer is made incident.

Hereinafter, actions and effects of the present invention will be described in more detail through specific examples, but these examples are given to merely illustrate the invention and are not intended to limit the scope of the invention thereto.

EXAMPLE 21 parts by weight of pentaerythritol tri(tetra)acrylate (hereinafter referred to as PETA), 21 parts by weight of hexafunctional urethane acrylate (hereinafter referred to as 6 UA), 3.2. parts by weight of Irgacure 184 as a photopolymerization initiator (hereinafter referred to as the initiator), 0.5 parts by weight of an additive Megaface F-477 (manufacturer: DIC Corporation) (hereinafter referred to as the additive), 22.18 parts by weight of 2-BuOH, 23 parts by weight of methyl ethyl ketone (hereinafter referred to as MEK) as an organic solvent, and 9.12 parts by weight of an aluminum particle solution (number average particle diameter: about 1.5 μm; average flattening ratio: 0.3; solid content 20 wt %; dispersion solvent: toluene) (hereinafter referred to as S-Al/T) were mixed to prepare a resin composition. The resin composition was coated on a substrate TAC (thickness: 80 μm) using a #8 bar, dried at 90° C. for 2 minutes and 30 seconds, and cured with a mercury lamp (at about 200 mJ/cm$^2$) to produce a visibility improving film for a display panel having an average dry thickness of 5 μm).

A visibility improving film for a display panel was produced by the same method by using each of the above-mentioned components with the compositions summarized in Table 1 below.

In the case of Examples 1 and 2 and Comparative Example 1, the above-mentioned spherical aluminum particle solution (number average particle diameter: about 1.5 μm; average flattening ratio: 0.3; solid content: 20 wt %; dispersion solvent: toluene) (hereinafter referred to as S-Al/T) was used as the fine metal particles.

In the case of Comparative Examples 2 to 4, a plate-like aluminum particle solution (number average particle diameter: about 5 μm; average flattening ratio: 0.8; solid content: 20 wt %; dispersion solvent: toluene) (hereinafter referred to as P-Al/T) was used as the fine metal particles.

In the case of Comparative Examples 5 to 7, organic fine particles 77BQ (Sekisui Chem) (number average particle diameter: about 3 μm; refractive index: 1.595; solid content: 11.6 wt %; dispersion solvent: propylene glycol methylether acetate) (hereinafter referred to as S—O) were used in place of the fine metal particles.

In the case of Comparative Examples 8 and 9, a plate-like aluminum particle solution (number average particle diameter: about 0.25 μm; solid content: 10 wt %; dispersion solvent: toluene) (hereinafter referred to as P-Al) was used as the fine metal particles.

In the case of Comparative Examples 10 and 11, $TiO_2$ fine particles (number average particle diameter: about 0.39 μm; solid content: 6.3 wt %; dispersion solvent: butyl cellosolve) (hereinafter referred to as S—$TiO_2$) were used in place of the fine metal particles.

The above compositions are summarized in Table 1 below.

TABLE 1

| Component (parts by weight) | Example 1 | Example 2 | Comparative Example 1 | Comparative Example 2 | Comparative Example 3 | Comparative Example 4 | Comparative Example 5 |
|---|---|---|---|---|---|---|---|
| PETA | 21 | 20 | 23 | 23 | 21 | 20 | 23 |
| 6UA | 21 | 20 | 23 | 23 | 21 | 20 | 23 |
| Initiator | 3.2 | 3 | 3.5 | 3.5 | 3.2 | 3 | 3.5 |
| Additive | 0.5 | 0.4 | 0.5 | 0.5 | 0.5 | 0.4 | 0.5 |
| 2-BuOH | 22.18 | 21 | 23 | 23 | 22.18 | 20.97 | 21 |
| MEK | 23 | 21.37 | 25.37 | 25.37 | 23 | 21.4 | 24.25 |
| Fine particle component | S—Al/T | S—Al/T | S—Al/T | P—Al/T | P—Al/T | P—Al/T | S—O |

TABLE 1-continued

| Content of fine particle dispersion | 9.12 | 14.23 | 1.63 | 1.63 | 9.12 | 14.23 | 4.75 |
|---|---|---|---|---|---|---|---|
| Content of fine particle | (1.824) | (2.846) | (0.326) | (0.326) | (1.824) | (2.846) | (0.551) |
| Sum | 100 | 100 | 100 | 100 | 100 | 100 | 100 |

| Component (parts by weight) | Comparative Example 6 | Comparative Example 7 | Comparative Example 8 | Comparative Example 9 | Comparative Example 10 | Comparative Example 11 | Comparative Example 12 |
|---|---|---|---|---|---|---|---|
| PETA | 20 | 17 | 23 | 20 | 23 | 20 | 21 |
| 6UA | 20 | 17 | 23 | 20 | 23 | 20 | 21 |
| Initiator | 3 | 2.5 | 3.5 | 3 | 3.5 | 3 | 3.2 |
| Additive | 0.4 | 0.35 | 0.5 | 0.4 | 0.5 | 0.4 | 0.5 |
| 2-BuOH | 19 | 16.54 | 23 | 20 | 23.36 | 20.3 | 22.18 |
| MEK | 21 | 18 | 25.36 | 22.33 | 25 | 22 | 23 |
| Fine particle component | S—O | S—O | P—Al/T | P—Al/T | S—$TiO_2$ | S—$TiO_2$ | — |
| Content of fine particle dispersion | 16.6 | 28.61 | 1.64 | 14.27 | 1.64 | 14.3 | |
| Content of fine particle | (1.926) | (3.319) | (0.164) | (1.427) | (0.103) | (0.901) | (0) |
| Sum | 100 | 100 | 100 | 100 | 100 | 100 | 90.88 |

Comparative Example 13: A25 film (LG Chem), which is an anti-glare film having a JIS K 7361 standard transmittance value of 90.4 and a haze value of 23.8 as measured by JIS K 7136 was prepared as a comparative example.

Measurement of Tt Value

The transmittance values (Tt) of the visibility improving films for display panels produced in the examples and comparative examples above were measured by a method according to JIS K 7361 using a haze meter HM-150 (Murakami).

Measurement of Haze Value

The haze values of the visibility improving films for display panels produced in the examples and comparative examples were measured by a method according to JIS K 7136 using a haze meter HM-150 (Murakami).

Measurement of Luminance Ratio

The visibility improving film for a display panel of Comparative Example 13 was bonded to a glass slide (0.7 mm) using a release film and placed on top of the LCD panel which was powered, and the luminance value measured at a height of 5.5 cm from the front side was obtained (A2), the visibility improving films for display panels of examples and comparative examples were bonded to a glass slide by the same method, and the luminance value measured under the same conditions was obtained (B2), and then the luminance values measured in the respective examples and comparative examples were snatched to calculate the luminance ratio (Measuring equipment: Konica Minolta, CA-210, LCD panel: 4.7 inches, Gray scale 255, 297.2 cd/m$^2$).

Measurements were carried out in a dark room below 3.5 1×.

Evaluation of Laser Pointer Visibility

When the visibility improving film for a display panel of Comparative Example 13 was bonded to a glass slide (0.7 mm) using a release film, placed on a black acrylic plate, and then irradiated with a 535-nm laser at 45° with respect to the normal line, the luminance value measured from the front side was obtained (A1), the visibility improving films for display panels of the examples and comparative examples were bonded to a glass slide by the same method, and the luminance value measured under the same conditions was obtained (B1), and then the luminance values measured in the respective examples and comparative examples were matched to calculate the visibility evaluation value (Measuring equipment: Konica Minolta, CA-210, laser pointer: 3M, LP-7000).

Measurements were carried out in a dark room below 3.5 1×.

Measurement of White Turbidity

The visibility improving film for a display panel of Comparative Example 13 was bonded to a glass slide (0.7 mm) using a release film, placed on a black acrylic plate, and then the luminance value was measured from the front side (Measuring equipment: Konica Minolta, CA-210).

Measurements were carried out under the condition of 9 1×.

Measurement of Color Index

The visibility improving films for display panels of the examples and comparative examples were bonded to a black PET sheet (manufacturer: TOMOEGAWA, trade name: KUKKIRIMIERU) and then exponent values of a* and b* were measured using a KONICA MINOLTA CM-2600d colorimeter.

The measurement results are summarized in Table 2 below.

TABLE 2

| Physical properties | Example 1 | Example 2 | Comparative Example 1 | Comparative Example 2 | Comparative Example 3 |
|---|---|---|---|---|---|
| Tt | 84.1 | 79.6 | 90.7 | 90.2 | 75.8 |
| Haze | 11.4 | 17.6 | 2.4 | 2.2 | 15.4 |

TABLE 2-continued

| | | | | | |
|---|---|---|---|---|---|
| Luminance ratio | 90.38 | 84.59 | 99.93 | 99.08 | 80.57 |
| Visibility | 4.64 | 7.48 | 0.81 | 1.82 | 15.67 |
| White turbidity | 6 | 9 | 2 | 2 | 13 |
| a* | −0.18 | −0.21 | −0.22 | −0.3 | −0.25 |
| b* | 0.98 | 0.83 | 1.08 | 1.07 | 0.23 |
| \|a*\| + \|b*\| | 1.16 | 1.04 | 1.3 | 1.37 | 0.48 |

| Component (parts by weight) | Comparative Example 4 | Comparative Example 5 | Comparative Example 6 | Comparative Example 7 | Comparative Example 8 |
|---|---|---|---|---|---|
| Tt | 68.2 | 92.2 | 91.7 | 91.4 | 89 |
| Haze | 22 | 4.1 | 13.7 | 26.6 | 2.7 |
| Luminance ratio | 72.71 | 101.36 | 100.85 | 100.11 | 97.53 |
| Visibility | 20.9 | 0.17 | 0.22 | 0.55 | 1.43 |
| White turbidity | 19 | 1 | 1 | 2 | 2 |
| a* | −0.28 | 0.04 | −0.26 | −0.2 | −0.38 |
| b* | 0.15 | 0.47 | 0.98 | 0.77 | 0.97 |
| \|a*\| + \|b*\| | 0.43 | 0.51 | 1.24 | 0.97 | 1.35 |

| Component (parts by weight) | Comparative Example 9 | Comparative Example 10 | Comparative Example 11 | Comparative Example 12 | Comparative Example 13 |
|---|---|---|---|---|---|
| Tt | 63.2 | 91.2 | 86.4 | 92.5 | 90.4 |
| Haze | 19.8 | 2.6 | 19.2 | 0.3 | 23.8 |
| Luminance ratio | 61.65 | 100.07 | 86.47 | 101.14 | 100 |
| Visibility | 11.19 | 1.29 | 14.19 | 0.14 | 1 |
| White turbidity | 11 | 2 | 16 | 0 | 3 |
| a* | −0.68 | −0.17 | −0.3 | 0.09 | −0.15 |
| b* | 0.27 | 0 | −6.4 | 0.52 | −0.35 |
| \|a*\| + \|b*\| | 0.95 | 0.17 | 6.7 | 0.61 | 0.5 |

Meanwhile, in the visibility improving films for display panels of the examples and comparative examples, in order to compare the unevenness of the surface, that is, a surface roughness value, a haze value, and visibility of a laser pointer, the arithmetic average surface roughness value, Ra, (μm) according to JIS 0601 was measured, and the results are summarized in Table 3 below.

TABLE 3

| | Example 1 | Example 2 | Comparative Example 12 | Comparative Example 13 |
|---|---|---|---|---|
| Ra | 0.0501 | 0.0463 | 0.02 | 0.372 |

Referring to Table 1 above, it can be confirmed that in the case of Examples 1 and 2, by using fine metal particles having a number average particle size value and a flattening ratio value in a specific range, the visibility of the laser pointer is very high while having excellent optical properties.

Specifically, it can be confirmed that in the case of the visibility improving film for a display panel according to the examples of the present invention, the visibility evaluation value is 4.64 and 7.48, all of this is 3 or more, or 4 or more. In particular, it can be clearly confirmed that as compared with Comparative Examples 12 and 13 not using aluminum particles, or Comparative Examples 5 to 7 using organic fine particles and the like, the luminance ratio increases by a minimum of five times, at most a few tens of times, and thus the visibility of a laser pointer light is greatly improved.

In addition, it can be confirmed that in the case of the comparative examples using the plate-like aluminum particles in excess or using titanium dioxide particles or the like in place of the aluminum particles of the examples of the present invention, the laser pointer light scattering occurs due to the corresponding particles in the film, and thus the visibility of the laser pointer can be improved to a certain extent, but the white turbidity value also greatly increases. In particular, in the case of Comparative Examples 3, 4, 9, and 11, the visibility evaluation value is about 10 or more and shows satisfactory physical properties for laser pointer light scattering, but the white turbidity value is measured to be 10 or more, or a value at which a and b change due to the Lab color index greatly appears, and the other optical property values of the film are largely lowered.

In contrast, in the case of Examples 1 and 2, the white turbidity value is less than about 10, and the value at which a and b change is also about 1, which confirms that the visibility of a laser pointer light can be greatly improved without largely degrading the other optical property values of the film.

Referring to Table 1 above, it can be confirmed that in the case of Examples 1 and 2, although the arithmetic average surface roughness value is not relatively high, the visibility of the laser pointer is very high. Specifically, in the case of the examples of the present invention, the arithmetic average surface roughness value is about 0.05, which shows that the unevenness is not large, but the visibility of a laser pointer light is excellent. In contrast, in the case of Comparative Example 12, it can be seen that the arithmetic average surface roughness value is relatively small, the haze value is small, and the effect of improving the visibility of the laser pointer light is not large. In the case of Comparative Example 13, it can be seen that the arithmetic average surface roughness value is relatively large and the haze value is large, whereas the effect of improving the visibility of the laser pointer light is not large. These results are considered to be attributable to the characteristic coating composition and the use of fine metal particles in the examples of the present invention.

The invention claimed is:

1. A visibility improving film for a display panel, comprising:
   a substrate; and
   a photocurable layer ded on at least one side of the substrate, comprising fine metal particles,
   wherein the fine metal particles consist essentially of a metal or a metal alloy and have a number average particle diameter of about 0.5 to 5 μm and a flattening ratio of about 0.3 to 0.5 and are dispersed in the photocurable resin layer,
   wherein a relative visibility evaluation value calculated by Formula 1 is about 3 or more:

Visibility Evaluation Value=$B1/A1$ [Formula 1]

wherein, in the Formula 1,
   A1 is a luminance value (cd/m$^2$) measured from he front side of a first control film when irradiated with a laser light at 45° with respect to the normal line, the first control film bonded to a glass slide and then placed on a backlight surface and the first control film having a transmittance value of about 70 to about 100 as measured according to JIS K 7361 and a haze value of about 20 to about 25 as measured according to JIS K 7136, and
   B1 is a luminance value (cd/m$^2$) measured from the front side of the visibility improving film for a display panel when irradiated with the same laser light at 45° with respect to the al line, the film bonded to a glass slide, and then placed on a backlight surface.

2. The visibility improving film for a display panel according to claim 1, wherein a value of luminance ratio calculated by Formula 2 is about 80% or more:

Luminance Ratio=$(B2/A2)*100$ [Formula 2]

wherein, in the Formula 2,
   A2 is a luminance value (cd/m$^2$) measured from the front side of a second control film bonded to a glass slide and then placed on a backlight surface, the second control film having a transmittance value of about 80 to about 100 as measured according to JIS K 7361 and a haze value of 20 to 25 as measured according to JIS K 7136, and
   B2 is a luminance value (cd/m$^2$) measured from the front side of the visibility improving film for a display panel, the film bonded to a glass slide and then placed on a backlight surface.

3. The visibility improving film for a display panel according to claim 1, wherein a white turbidity value calculated by Formula 3 is about 10 or less:

White Turbidity=$C*100$ [Formula 3]

wherein, in the Formula 3,
   C is a luminance value (cd/m$^2$) measured of 7 cm from the front side of the visibility improving film for a display panel, the film bonded to a glass slide, then placed on a black acrylic plate and kept under the condition of 9 1x.

4. The visibility improving film for a display panel according to claim 1, wherein a color difference value calculated by Formula 4 is about 2 or less:

Color Difference=$|a*|+|b*|$ [Formula 4]

wherein, in the above Formula 4,
   $a*$ and $b*$ are exponent values in the CIE 1976 $L*a*b*$ color model, respectively.

5. The visibility improving film for a display panel according to claim 1, wherein the metal is at least one selected from aluminum, gold, silver, magnesium, platinum, copper, titanium, zirconium, nickel, tin, silicon, and chromium.

6. The visibility improving film for a display panel according to claim 1, wherein the fine metal particles have a number average particle diameter of about 0.5 to μm.

7. The visibility improving film for a display panel according to claim 1, wherein the fine metal particles are contained in an amount of about 0.5 to about 15 parts by weight, based on 100 parts by weight of the photocurable resin.

8. The visibility improving film for a display panel according to claim 1, wherein the photocurable resin layer has a thickness of about 1 to about 50 μm.

9. The visibility improving film for a display panel according to claim 1, wherein the ratio of the number average particle diameter of the fine metal particles to the thickness of the photocurable resin layer is about 0.5 or less.

10. The visibility improving film for a display panel according to claim 1, wherein the haze value measured according to JIS K 7136 is about 20% or less.

11. The visibility improving film for a display panel according to claim 1, wherein the light transmittance value (Tt) measured according to JIS K 7361 is about 70% or more.

12. The visibility improving film for a display panel according to claim 1, wherein the film has a pencil hardness of HB or more at a load of 500 g.

13. The visibility improving film for a display panel according to claim 1, wherein the substrate includes at least one selected from the glass, polyethylene terephthalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetherether ketone (PEEK), polyethylene naphthalate (PEN), polyetherimide (PEI), polyimide (PI), MMA (methyl methacrylate), a fluorocarbon resin, and triacetylcellulose (TAC).

14. A display device comprising a display panel and the visibility improving film for a display panel of claim 1.

15. A display panel comprising the visibility improving film for a display panel of claim 1.

* * * * *